US012228386B2

(12) United States Patent
Rasch et al.

(10) Patent No.: US 12,228,386 B2
(45) Date of Patent: Feb. 18, 2025

(54) MOBILE DEFUSING CHAMBER

(71) Applicants: thyssenkrupp Marine Systems GmbH, Kiel (DE); thyssenkrupp AG, Essen (DE)

(72) Inventors: Axel Rasch, Hamburg (DE); Albert Ulbertus, Hamburg (DE); Tommy Kaltofen, Jesteburg (DE)

(73) Assignees: thyssenkrupp Marine Systems GmbH, Kiel (DE); thyssenkrupp AG, Essen (DE)

(*) Notice: Subject to any disclaimer, the term of this patent is extended or adjusted under 35 U.S.C. 154(b) by 0 days.

(21) Appl. No.: 18/029,733

(22) PCT Filed: May 31, 2021

(86) PCT No.: PCT/EP2021/064472
§ 371 (c)(1),
(2) Date: Mar. 31, 2023

(87) PCT Pub. No.: WO2022/069086
PCT Pub. Date: Apr. 7, 2022

(65) Prior Publication Data
US 2023/0366663 A1 Nov. 16, 2023

(30) Foreign Application Priority Data
Oct. 1, 2020 (DE) ..................... 10 2020 212 443.4

(51) Int. Cl.
*B02C 19/00* (2006.01)
*B02C 13/31* (2006.01)
(Continued)

(52) U.S. Cl.
CPC .............. *F42B 33/06* (2013.01); *B02C 13/31* (2013.01); *B02C 19/00* (2013.01); *B02C 19/061* (2013.01);
(Continued)

(58) Field of Classification Search
CPC ....... B02C 19/00; B02C 19/061; B02C 23/04; B02C 23/24; B02C 13/31
(Continued)

(56) References Cited

U.S. PATENT DOCUMENTS 4,245,790 A * 1/1981 Williams ................ B02C 13/31 241/31
5,233,932 A * 8/1993 Robertson ................ F23G 5/50 241/31
(Continued)

FOREIGN PATENT DOCUMENTS

CN 112973938 A * 6/2021 ............. B02C 19/00
CN 115979090 A * 4/2023 ............. B02C 19/00
(Continued)

OTHER PUBLICATIONS

English Translation of International Search Report issued in PCT/EP2021/064472, dated Sep. 3, 2021.

*Primary Examiner* — Faye Francis
(74) *Attorney, Agent, or Firm* — thyssenkrupp North America, LLC

(57) ABSTRACT

A delaboration chamber has an outer housing that can be sealed by a removable cover. The delaboration chamber has an inner floor. A first chamber region is formed underneath the inner floor by the inner floor and the outer housing. The first chamber region is filled with a flowable or solid medium. The inner floor has a recess for receiving an explosive object. The cover is connected to the outer housing in a shockproof manner. The cover has a pressure relief that has at least one deflection for the detonation gases.

15 Claims, 1 Drawing Sheet

(51) Int. Cl.

| | |
|---|---|
| ***B02C 19/06*** | (2006.01) |
| ***B02C 23/04*** | (2006.01) |
| ***B02C 23/24*** | (2006.01) |
| ***B63B 35/00*** | (2020.01) |
| ***F42B 33/06*** | (2006.01) |

(52) U.S. Cl.
CPC .............. *B02C 23/04* (2013.01); *B02C 23/24* (2013.01); *B63B 35/00* (2013.01); *F42B 33/062* (2013.01); *F23G 2209/16* (2013.01)

(58) Field of Classification Search
USPC ................................ 241/31; 220/88.1, 560.1
See application file for complete search history.

(56) References Cited

U.S. PATENT DOCUMENTS

| | | | | | |
|---|---|---|---|---|---|
| 5,884,569 | A * | 3/1999 | Donovan | ................ | F42D 5/045 110/237 |
| 6,173,662 | B1 | 1/2001 | Donovan | | |
| 6,881,383 | B1 | 4/2005 | Tschritter et al. | | |
| 11,123,748 | B1 * | 9/2021 | Metcalf | ................. | B02C 18/182 |
| 11,618,037 | B1 * | 4/2023 | Metcalf | ................. | B02C 18/182 241/31 |
| 2007/0119851 | A1 * | 5/2007 | James | ..................... | F42B 39/20 220/88.1 |
| 2007/0131684 | A1 * | 6/2007 | Cirillo | ..................... | F42B 39/14 220/88.1 |
| 2015/0266667 | A1 | 9/2015 | Donovan | | |

FOREIGN PATENT DOCUMENTS

| | | | | | |
|---|---|---|---|---|---|
| DE | 103 28 154 | A1 | 12/2004 | | |
| DE | 10 2016 115 468 | A1 | 2/2018 | | |
| EP | 20040 | A * | 12/1980 | ........... | B09B 3/0058 |
| EP | 1 128 875 | | 9/2001 | | |
| EP | 2952848 | A1 * | 12/2015 | ............... | F42D 5/04 |
| FR | 2 926 224 | A1 | 7/2009 | | |
| JP | 06226136 | A * | 8/1994 | ............. | B02C 23/04 |
| WO | WO-9923419 | A1 * | 5/1999 | ............. | F23G 5/006 |
| WO | 00/37880 | A2 | 6/2000 | | |
| WO | WO-2004068063 | A1 * | 8/2004 | ............. | F42D 5/045 |
| WO | WO-2005078380 | A1 * | 8/2005 | .............. | F42B 39/14 |
| WO | 2012/082002 | A1 | 6/2012 | | |

* cited by examiner

MOBILE DEFUSING CHAMBER

CROSS REFERENCE TO RELATED APPLICATIONS

This application is a U.S. National Stage Entry of International Patent Application Serial Number PCT/EP2021/064472, filed May 31, 2021, which claims priority to German Patent Application No. DE 10 2020 212 443.4, filed Oct. 1, 2020, the entire contents of which are incorporated herein by reference.

FIELD

The present disclosure generally relates to a device for the safe delaboration of salvaged ordnance, munition, pieces of munition and the like. The delaboration comprises the process from salvage through transportation and breakdown to destruction, for example by incineration.

BACKGROUND

In the oceans of the world, in particular in the North Sea and Baltic, there are large amounts of ordnance in the broadest sense. Some of these are deliberately deployed objects, such as for example sea mines, for example tethered mines, or bombs that have been dropped. Some are unexploded bombs that were used in action but failed to go off. Also, particularly after the war, very large amounts of ordnance were dumped. Particularly the latter also comprise ordnance with chemical warfare agents. In terms of size, these objects range from rifle or machine gun ammunition through mines and naval artillery shells to bombs. It is thought that, in the North Sea and Baltic together, there are at least 5 million suspect objects that could be such munition. In the territorial waters of Germany alone it is estimated that there are at present approximately 1.6 million tonnes of conventional hazardous waste.

Many of these objects have by now been in salty water for over 75 years. As a result, this munition is often in an undefined state of decay and, in particular with regard to water tightness, an undefined state of chemical stability of the explosives contained and an undefined state of safety for being transported. This leads to procedural difficulties when handling these objects, which makes it much more difficult to dispose of this hazardous waste.

On the one hand, the munition represents a great danger. For example, chemical substances, for example poisonous gases used in combat, can escape over time due to corrosion, which represents a great risk to the ecosystem. Similarly, ships can come into contact with the munition and inadvertently set them off. For example in the case of tethered mines, there is the risk that the chain attaching the mine to the seabed is separated and the mine becomes a floating mine and therefore can also get into areas that are considered safe, for example a shipping channel. White phosphorus that has escaped and washed up on a beach often leads to injuries. It would therefore be desirable to remove all objects.

On the other hand, however, particularly clearance is very critical, since it requires that the ordnance has to be seized, moved and dismantled. During all of these actions there is an increased risk of the explosive substances undergoing a reaction. It is therefore advantageous to minimize the number of operations involving movement.

If a suspect object is found, after visual inspection it must be decided whether the object is transportable or can be made so. For example, unexploded bombs can possibly be made transportable by removing the detonator. The decision concerning the assessment of whether an object is transportable is an official task in Germany, which can be carried out for example by explosive ordnance clearance services acting on behalf of the regional government.

Safely transportable objects must then be transported to delaboration. However, many objects are too large to be sent directly for further disposal, for example incineration, since the amount of explosive sent for incineration at the same time would then be too great for the process still to be handled safely. These objects are therefore broken up, for example by cutting them up.

WO 2007/068020 A1 discloses a transportable system for defusing munition containing fluid warfare agents.

DE 10 2008 119 339 A1 discloses a method and a device for defusing an unexploded bomb under water.

DE 39 13 479 C1 discloses a method and a system for the delaboration of toxic and/or explosive objects, in particular of chemical weapons.

However, various technical problems of these existing approaches have not yet been solved, and so solutions that can be used reliably for the large amount of objects to be cleared must be found. It would therefore be desirable to minimize the distance over which an object found under water has to be transported and to delaborate the object safely while at the same time minimizing movements. This however gives rise to the problem that it is much more difficult at sea to provide corresponding structural measures, such as for example bunkers or earthworks, since the weight would exceed by far the weight that can be borne by a floating platform. Furthermore, these measures also cannot be applied to the space conditions concerned, for example and in particular safety distances cannot be realistically chosen to be as great as desired.

This is therefore also desirable because it is already problematic or even impossible for munition or pieces of munition of an undefined state to be transported and brought onto land. Furthermore, munition outside territorial areas, that is to say outside the coastal waters of the 12-mile zone, sometimes cannot be brought onto land, or with difficulty, for legal reasons. Transporting munition, and most particularly chemical weapons, from outside this area into the territorial area of a state may be problematic to impossible simply for legal reasons, for example on the basis of the Chemical Weapons Convention and national laws.

Therefore, with every critical step of the process, it must in particular be taken into consideration that there is the risk of the entire amount of explosive going off at once. In particular, this risk exists in principle at times at which mechanical work is being performed on the object. It must in this case be taken into consideration that, especially when being used at sea, space and weight are not limitlessly available, and therefore, even in the case of such an eventuality, the protection also of other equipment, personnel but also in particular the supporting platform, must be ensured. Furthermore, it must of course be taken into consideration that, in particular, shrapnel produced by an explosion represents a considerable threat.

Thus a need exists to provide a device which allows safe delaboration and in particular thereby the breaking down of the objects at sea.

DETAILED DESCRIPTION

Figure 1:
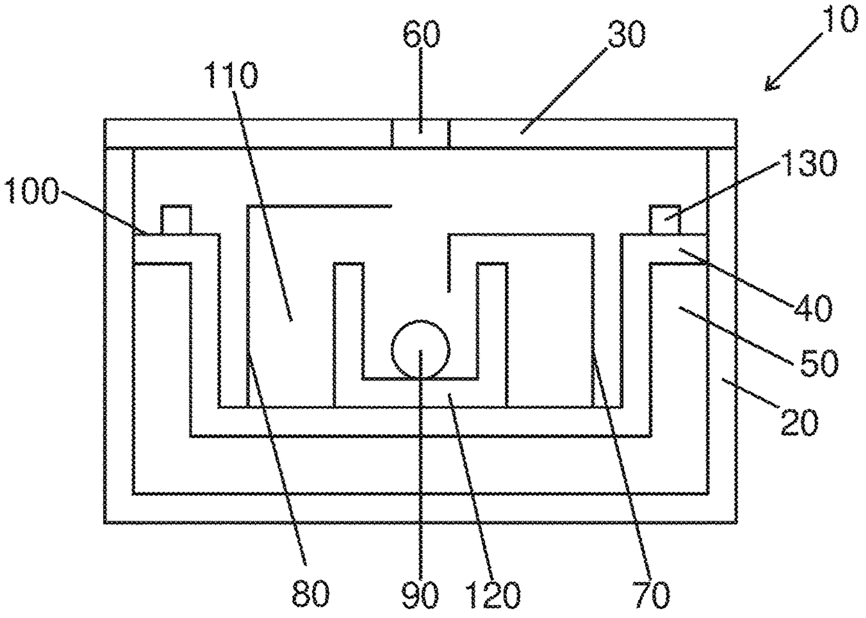
FIG. 1 is a delaboration chamber.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting “a” element or “an” element in the appended claims does not restrict those claims to articles, apparatuses, systems, methods, or the like having only one of that element, even where other elements in the same claim or different claims are preceded by “at least one” or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The delaboration chamber according to the invention has an outer housing. The outer housing can be sealed by a removable cover. The delaboration chamber has an inner floor, wherein a first chamber region is formed underneath the inner floor by the inner floor and the outer housing. The first chamber region is preferably closed. The first chamber region is filled with a flowable or solid medium. For example and preferably, the first chamber region is filled with concrete, sand or water. The inner floor has a recess for receiving an explosive object. In this way, the explosive object (the ordnance) is intended to be completely within the recess. As a result, in the event of an unwanted detonation, part of the pressure wave would be directed against the inner floor, and therefore against the filling of the first chamber region. It is intended by this geometry that the pressure wave of the detonation is at least partially deflected towards the region with the least resistance, therefore upwards. In the closed state, the cover is connected to the outer housing in a shockproof manner. As a result, even in the event of a detonation, the cover remains in place. The cover has a pressure relief, wherein the pressure relief has at least one deflection for the detonation gases. The pressure relief serves the purpose of specifically diverting away gases and pressures occurring in the event of a detonation. A deflection of these gases is necessary in spite of the high pressure, in order to prevent shrapnel from leaving the delaboration chamber and damaging further items of equipment or even injuring personnel.

A deflection as provided by the invention is any device which deflects a stream of gas, and therefore prevents the stream of gas from being conducted in a straight line. The reason for this is that, for example, a piece of shrapnel moves in a straight line after detonation, and is not intended to deviate even as a result of the pressure relief. The pressure relief may for example be of a spiral or labyrinthine form, with deflections at right angles.

A removable cover as provided by the invention is for example able to be lifted off, swung in a hinged manner or slid. It is essential that the cover is removable in such a way that an ordnance can be lifted into the delaboration chamber from above. After sealing, however, the cover must be connected to the outer housing so securely that the cover does not come away from the outer housing even in the event of an unwanted detonation of the ordnance. This is so because this would make the cover itself become a projectile. On account of the high mechanical requirements in the closed state, a slidable cover is preferred. For this purpose, the cover is brought horizontally into a position alongside the delaboration chamber in order to open the delaboration chamber.

A flowable medium comprises not only liquids but also flowable solids, in particular bulk materials. For example, sand or gravel is a flowable medium as provided by the invention. In the event of a shock, a flowable medium makes a deformation possible, while at the same time a force transmission is nevertheless possible.

The outer housing and the cover preferably have at least protection from 20 mm “Fragment Simulating Projectiles (FSP)” according to MIL-DTL-46593. The weight of the shrapnel is about 54 g, with the requirement that shrapnel with a defined kinetic energy, for example of at least 67 kJ, must be safely withstood. This corresponds to protection class G9 according to NATO standard STANAG 2920. The protective effect can be influenced in both directions by adaptation of the design and choice of the materials, and so possibly, depending on the size of objects, different chambers could also be used. Consequently, significantly higher protection classes would also be conceivable. This is meaningful because the large amount of ordnance tends to be smaller, but the few large ordnances are comparatively problematic.

In one embodiment of the invention, the recess has a receiving position for a pallet. Preferably, the receiving position ensures that the pallet, and with the pallet an ordnance introduced on the pallet, is in a predefined position in the delaboration chamber, in particular in a defined position in relation to a cutting device. In particular, the receiving position has guiding elements in order to guide a pallet into a predefined position when it is being introduced.

In one embodiment of the invention, the inner floor is a removable floor container, whereby the first chamber region is formed by the insertion of the floor container. Particularly preferably, for this the floor container has a sealable opening, which is for example provided in a wall of the floor container, preferably at a high point, in order to be able to fill a medium, or a precursor forming the medium, into the first chamber region. An example of a precursor forming the medium may be liquid, not yet cured concrete or a monomer or oligomer, which is polymerized in the first chamber region. In the case of a curable precursor, the cured medium itself may also bring about the sealing of the opening.

In a further alternative embodiment, the inner floor and the first chamber region are formed by a chamber container. For example, the chamber container is a hollow body which may be filled for example with water or sand, preferably after it has been inserted into the delaboration chamber. Preferably, for this the chamber container has a sealable opening, which is preferably arranged at a high point of the chamber container.

In a further embodiment, the cover is formed as a hollow body, which may be filled with a flowable medium. The hollow space in the cover may in this case itself be formed as leakproof for the flowable medium, or the medium is introduced into the hollow space in a container, for example a leakproof bag. Particularly preferably, a cover formed as a hollow body has additional reinforcements between the upper side and the underside, for example in the form of annular stiffeners or diagonal stiffeners. In this embodiment, the pressure relief is arranged in a connecting manner between the upper side and underside of the cover, in order to make it possible for gas to pass through. Particularly preferably, a fire-retardant medium is used here as the flowable medium, in the simplest case water.

In a further embodiment of the invention, the delaboration chamber has at least one separating device. The separating device is in this case preferably a cutting device. More preferably, the cutting device is a water-jet device. Alternatively preferably, the cutting device is a bandsaw. In a further embodiment, the delaboration chamber has two cutting devices, one being formed as a water-jet device and the other as a bandsaw. In the embodiment of a water-jet device, the delaboration chamber has a water drain, wherein the water drain preferably extends through the inner floor, the first chamber region and the outer housing. If the cutting device is a water-jet device, the pressure pump for generating the water under high pressure is preferably arranged outside the delaboration chamber. Preferably, the pressure pump is arranged underneath the uppermost level of the inner floor. Consequently, the pressure pump is protected particularly efficiently from pressure waves. A pressure pump may also supply two or more cutting devices in two or more delaboration chambers with water under high pressure. The cutting device is in this case particularly preferably remote-controllable and can be operated from a remotely located control device.

In a further embodiment of the invention, the cutting device is connected to a gripping device. Preferably, the cutting device and the gripping device are arranged on a robot arm. A nonpositive connection to the ordnance is established by the gripping device, and so the forces generated by the cutting device when cutting up the ordnance are not dissipated through the robot arm, but directly into the ordnance. This is particularly preferred when large and heavy ordnances are being broken up.

In a further embodiment of the invention, the delaboration chamber has at least one first chamber lifting device. The chamber lifting device serves the purpose of lifting pieces of munition detached from an ordnance out of the recess.

In a further embodiment of the invention, the pressure relief is ensured by one or more outlet openings in the cover, wherein the outlet openings may preferably be formed as predetermined breaking points. The outlet openings may for example be of a circular form. The predetermined breaking point gives way when there is a defined gas pressure as a result of an unwanted detonation during the delaboration and exposes a nozzle-shaped outlet. Arranged in the nozzle-shaped outlet are various plates, which in their function as baffles ensure a deflection and slowing down of the explosion gas occurring. As a result, the explosion gases occurring escape in a specifically directed upward manner, and so the neighbouring component parts of the delaboration platform are protected. The arrangement of the baffles in the outlet also provides protection from escaping shrapnel. In particular, the predetermined breaking point may be circular. Alternatively, it may be provided that the predetermined breaking point is movably fastened to the cover and is inhibited in movement by an overload protection, wherein the overload protection is dimensioned in such a way that, when it is subjected to pressure, it gives way before the cover as a whole gives way. It may for example be a covering which is fastened by a hinge and prevented from twisting by a shearing pin.

In a further embodiment of the invention, the inner floor has a planar depositing area, wherein the depositing area is arranged above the recess for receiving an explosive object (an ordnance). As a result, pieces of munition can be kept in an area that is not directly affected in the event of a detonation, and the chance that they are possibly not made to go off at the same time during the detonation is increased, and so the overall damage can be reduced.

In a further embodiment of the invention, the delaboration chamber is connected to a gas cleaning means. If the ordnance is an ordnance with a chemical warfare agent, there is a great probability that this agent is released when the ordnance is being broken up. It is therefore desirable to be able to remove the chemical agent from the air of the delaboration chamber before it is opened and allows the chemical agents to be released directly into the atmosphere. In the simplest case, the air is conducted by means of simple extraction into a combustion chamber or directly into a flare stack and made harmless by combustion. As an alternative or in addition, filters may be used, for example activated carbon filters.

In a further embodiment of the invention, the pressure relief is connected to a gas cleaning means. This has the advantage that, even in the event of an unwanted detonation of an ordnance with a chemical warfare agent, it is not released and therefore people are not put at risk.

In a further embodiment of the invention, the delaboration chamber has an x-ray device. In particular, the x-ray device serves the purpose of identifying ordnances which have warfare agents that cannot or should not be processed in the delaboration chamber and these ordnances are not broken down. Ordnance identified in this way may be for example incendiary bombs with white phosphorus, which would begin to burn on contact with air. Similarly, chemical warfare agents which cannot be safely destroyed by the installations provided can be identified. Here, too, it is advantageous for these not to be broken down.

In a further embodiment of the invention, the delaboration chamber has at least one sensor for sensing unconventional warfare agents. For example and in particular, the sensor for sensing unconventional warfare agents is designed for sensing a warfare agent from the group of CBRN agents. Should there be a release within the delaboration chamber that is sensed by the sensor for sensing unconventional warfare agents, the delaboration chamber can preferably remain sealed until decontamination. The sensor may in this case preferably be arranged in the extraction system.

In a further embodiment of the invention, the delaboration chamber has a lifting platform, on which pieces of munition can be deposited directly or in containers, in particular in flammable boxes, in particular in cardboard boxes. Then, after opening of the cover, the lifting platform can take the pieces of munition for example to the level of the cover, and so they can be removed more easily. For example, the lifting platform may be connected to a conveying system, for example a roller conveying system, in order to transport the pieces of munition further.

If the first chamber region is filled with a solid medium, for example concrete, in a further embodiment of the invention the first chamber region and the outer housing may also form a unit, for example also by liquid concrete being poured into the outer housing and connecting to the outer housing when it cures.

In a further aspect, the invention relates to a floatable delaboration platform. A floatable platform as provided by the invention may be for example a ship, a pontoon, a barge, a raft, a semisubmersible platform or a lifting island.

The floatable delaboration platform has at least one first lifting device, at least one first delaboration chamber according to the invention and at least one first destruction installation, for example and preferably an incineration device.

The great advantage of such a floatable delaboration platform is on the one hand that the number of trips for transporting an ordnance until final destruction is reduced to a minimum, and so the risk of an unwanted detonation is reduced. On the other hand, it is possible also to destroy objects which are chemically not completely known. Otherwise, before being transported, each object would have to be laboriously checked to be able to ensure that it is safe to transport. Furthermore, objects, for example also chemical warfare agents, that are found outside the 12-mile zone can be destroyed without having to import them into a country.

In a further embodiment of the invention, the floatable delaboration platform has at least one first platform region and one second platform region. The at least one first delaboration chamber is arranged in the first platform region and the at least one destruction unit, preferably the first incineration device, is arranged in the second platform region. At least one first protective element is arranged between the first platform region and the second platform region, wherein the at least one first protective element has a surface. The surface of the protective element has an angle of 120° to 150° in relation to the surface of the first platform region and an angle of 30° to 60° in relation to the surface of the second platform region. As a result, a pressure wave which emanates from a detonation in a delaboration chamber would be deflected in the upward direction and so the incineration device lying behind it would be protected.

In a further embodiment of the invention, the floatable delaboration platform has a transporting device for transporting pieces of munition from the at least one first delaboration chamber to the at least one first incineration device. The transporting device may be for example a transporting belt, transporting rail or other continuous transporting system on which the pieces of munition lie directly or on which transporting containers containing pieces of munition lie. The transporting belt may in this case be automatically controlled.

In a further embodiment of the invention, the floatable delaboration platform has double bulkheads and/or stabilizing bulkheads and/or reinforced structures within the delaboration platform. This serves the purpose of limiting the influence to a region of the delaboration platform in the event of damage occurring.

In a further embodiment of the invention, the floatable delaboration platform has in addition to the at least one first delaboration chamber according to the invention at least one first pre-dismantling delaboration chamber. The at least one first pre-dismantling delaboration chamber is in principle constructed like the delaboration chamber according to the invention. In this embodiment, large ordnances are first introduced into the first pre-dismantling delaboration chamber and broadly broken down there, in particular broken up into slices of a uniform width with a bandsaw. The large ordnances broken down in this way are then transferred from the first pre-dismantling delaboration chamber into the first delaboration chamber and further broken down there to the size required for final destruction. Consequently, the first pre-dismantling delaboration chamber and the first delaboration chamber preferably differ by a different separating device for breaking down the ordnance. For example, the first pre-dismantling delaboration chamber has a cutting device in the form of a bandsaw, which is suitable for cutting up even large objects, for example sea mines or bombs weighing more than one tonne, into slices of uniform thickness. The first delaboration chamber then preferably has a smaller separating device than the first pre-dismantling delaboration chamber, which is designed to dismantle further the slices that have been produced in the first pre-dismantling delaboration chamber. Similarly, ordnances which are for example smaller than the slices that are produced in the first pre-dismantling delaboration chamber can be introduced directly into the delaboration chamber. As a result, ordnance of greatly differing sizes can be easily processed.

The first pre-dismantling delaboration chamber may for example dispense with a device for transporting the ordnance. For example, the ordnance may be introduced into the first pre-dismantling delaboration chamber on a pallet and be dismantled on this pallet. Subsequently, all of the slices may be taken out of the first pre-dismantling delaboration chamber together on the pallet and be brought into the first delaboration chamber together by means of the pallet. For example, they may be lifted out of the first pre-dismantling delaboration chamber into the first delaboration chamber by a lifting device or be transported between the two chambers by means of a transporting belt or a roller conveyor.

By contrast with this, the first delaboration chamber has for example a device for separating the parts of the ordnance, in order to be able then to pass them on for destruction, in particular incineration.

A further advantage of this embodiment with at least one first delaboration chamber and at least one first pre-dismantling delaboration chamber is that the numerical relationship between the pre-dismantling delaboration chambers and the delaboration chambers can be adapted to the expected size distribution. If, for example, it were assumed that in terms of weight only fewer than 25% of the ordnances will be of such a size as to require pre-dismantling, four delaboration chambers could be combined with one pre-dismantling delaboration chamber.

In a further embodiment of the invention, the floatable delaboration platform has an intermediate store, in which the pieces of munition that are taken from the delaboration chamber can be intermediately stored. As a result, for example, the destruction process can be balanced out. For example, salvaging of ordnance at night may be suspended for safety reasons, but an incineration device may continue to be operated continuously.

In a further aspect, the invention relates to a method for destroying underwater ordnance with a floatable delaboration platform according to the invention. The method comprises the following steps:

a) lifting an ordnance out of the water by means of the at least one first lifting device,
b) pivoting the ordnance over the at least one first delaboration chamber, wherein the delaboration chamber is arranged on the floatable delaboration platform and wherein for example and preferably the cover of the at least one first delaboration chamber is open,
c) lowering the ordnance into the at least one first delaboration chamber, into the recess in the inner floor,
d) sealing the at least one first delaboration chamber, for example and preferably with the cover.
e) breaking up the ordnance within the delaboration chamber, wherein a piece of munition, preferably of a size of 5 kg to 10 kg, is detached,
f) repeating step e) until the ordnance is dismantled to the extent that it can be processed further,
g) opening the at least one first delaboration chamber, for example and preferably by removing the cover,
h) lifting out the pieces of munition from the at least one first delaboration chamber,
i) transporting the pieces of munition to the at least one first destruction device, in particular a first incineration device,
j) incinerating the pieces of munition in the at least one first incineration device.

The great advantage of the method according to the invention is that the legal requirements for handling munition are met and the trips for transporting an ordnance are minimized. It is lifted out of the water and deposited directly into the delaboration chamber in one action. Further intermediate storages and transportations can thus be avoided. Every storage transfer and every transporting trip represents an additional risk of an unwanted detonation occurring.

By completely breaking up the ordnance into small pieces of munition that can be incinerated directly, the subsequent further processing and final destruction are comparatively easy. During all intermediate steps involved in the breaking up of the ordnance, the delaboration chamber is closed, and so all steps with an associated risk are carried out in such a way that protection of the floatable delaboration platform and the environment are given high priority. The ordnance has then been dismantled completely when it has been dismantled into such small pieces that further processing of all the individual pieces, and therefore of the ordnance as a whole, is possible. For example, they can be incinerated in an incineration device without damaging the latter.

The transportation of the pieces of munition to the at least one first destruction device, in particular a first incineration device, in step i) may also comprise intermediate storage. This may for example serve the purpose of balancing out the flow of material, for example fed to a combustion chamber. The transportation may also be performed in a number of sub-steps and also by means of various transporting devices. For example, a first transporting step may be the lifting out, which may for example be performed by means of a crane or a lifting platform. Furthermore, for example, a horizontal conveying system may be used.

For practical reasons, the lifting in step a) may also be performed by another watercraft. In this case, between step a) and step b) there is also transportation to the floatable delaboration platform. An advantage of this is that the floatable delaboration platform has to be moved less, a disadvantage is that a second watercraft is required.

The breaking up of the ordnance in step e) within the delaboration chamber is preferably performed in such a way that the pieces of munition are of a size of 5 kg to 10 kg, which at present represents an optimum. This size can be processed well by the currently used incineration furnaces. If the pieces of munition are too large, the energy released in the short term is too great. Unnecessary breaking up is laborious and unnecessarily hazardous. If, however, other incineration furnaces are used, the size of the pieces of munition is adapted to their specifications.

The repetition in step f) takes place until the ordnance has been dismantled to the extent that it can be processed further, that is to say dismantled completely into pieces of munition that can be incinerated in the incineration device. Usually, the size of the pieces of munition are currently 5 kg to 10 kg. If therefore, for example, an ordnance of 100 kg is to be broken up, it may be broken up for example into 10 pieces of munition of 10 kg each. The ordnance has then been dismantled completely into pieces of munition that can be processed further.

Preferably, the at least one first lifting device has a lifting and salvaging tool suitable for transporting ordnance.

In a further embodiment of the invention, the following steps are performed between step a) and step b):

m) pivoting the ordnance over the at least one first pre-dismantling delaboration chamber, wherein the pre-dismantling delaboration chamber is arranged on the floatable delaboration platform and wherein the cover of the at least one first delaboration chamber is open, n) lowering the ordnance into the at least one first pre-dismantling delaboration chamber, into the recess in the inner floor, o) sealing the at least one first pre-dismantling delaboration chamber with the cover, p) pre-dismantling the ordnance within the delaboration chamber into pieces in the form of slices, q) repeating step p) until the ordnance has been dismantled to the extent that it can be processed further, r) lifting an ordnance cut into slices out of the pre-dismantling delaboration chamber by means of the at least one first lifting device.

In a further embodiment of the invention, in step e), after breaking up the ordnance, the piece of munition is brought onto a planar area of the inner floor. For example, this area may also be a transport container, which is located inside the delaboration chamber. An advantage is that the pieces of munition that have already been detached do not cause any problem during the further breaking up of the ordnance and, in the possible event of an unwanted explosion of the ordnance in the further breaking up, are not detonated, or only with a time delay, and so the intensity of the pressure wave of the detonation can be reduced.

In a further embodiment of the invention, between step c) and step d), a transillumination device is placed onto the opened delaboration chamber. With the transillumination device, the ordnance is transilluminated. Subsequently, the transillumination device is removed again. This has the advantage that the ordnance does not first have to be placed into a transillumination device, or even transported through it. After being deposited, the ordnance remains unmoved. Consequently, the risk of an unwanted detonation during the transillumination is minimized. For example and preferably, the transillumination is performed by means of x-ray radiation. The x-ray radiation may be generated for example by an x-ray tube. In order to be able to provide the necessary energies for the transillumination of a heavy metal housing, however, a free-electron laser may also be used as a source.

In an alternative embodiment, before step c), a transillumination device by which an ordnance can be transported into the delaboration chamber is placed onto the opened delaboration chamber. After step c) and before step d), the transillumination device is removed. This embodiment also has the advantage that the ordnance does not have to be additionally introduced into a separate transillumination device and removed from it again. Rather, in the case of this embodiment, it is already transilluminated while it is being introduced into the delaboration chamber.

In a further embodiment of the invention, the ordnance is lifted out of the water in a transporting container in step a) and is introduced into the delaboration chamber in the transporting container in step c). Subsequently, it is broken up in the transporting container or with the transporting container in step e). This means that the ordnance does not have to be relocated once again. The ordnance is placed into the transporting container under water and to the extent this step, which is also protected by the water column above the ordnance, the ordnance is no longer moved in relation to the transporting container and as a result the risk of unwanted detonation is minimized. Depending on the ordnance, type of ordnance, or size of ordnance, but also depending on the type of cutting device, it may be advantageous to cut up the transporting container together with the ordnance. This of course has the disadvantage that the transporting container can only be used once, but possibly has the advantage of further minimizing movement of the ordnance.

In a further embodiment of the invention, the pieces of munition are deposited into flammable boxes, in particular into cardboard boxes, in step e), are transported in the flammable boxes, in particular in the cardboard boxes, in steps h) and i), and are incinerated with the flammable boxes, in particular with the cardboard boxes, in step j).

In FIG. 1, a delaboration chamber 10 is shown. The delaboration chamber 10 has an outer housing 20 and can be sealed with a removable cover 30. For example, the cover 30 is horizontally slidable, in order to open the delaboration chamber 10. In the example shown, the outer housing 20 and the cover 30 are formed to conform to protection class G9 according to NATO standard STANAG 2920 in order to be able to effectively withstand shrapnel of up to 67 kJ. Similarly, the connection between the outer housing 20 and the cover 30 is formed in such a way that the cover 30 is not detached from the outer housing 20 in the event of a detonation.

Arranged inside the delaboration chamber 10 is an inner floor 40, which has a recess 110 for receiving an ordnance 90. Formed between the outer housing 20 and the inner floor is a first chamber region 50, which in the example shown is filled with sand. Alternatively, the first chamber region 50 could be filled with concrete.

The cover 30 has a pressure relief 60, which in the example shown is of a labyrinthine form, in order that no splinters can get out through the pressure relief 60 if opening occurs in the event of an explosion.

In the example shown, the recess 110 is made of such a size that the ordnance 90 can be introduced in a transporting container 120 and broken up in it. For this purpose, a cutting device 70 and a chamber lifting device 80 are likewise arranged in the recess. The chamber lifting device 80 may in particular bring pieces of munition detached by the cutting device 70 into a cardboard box 130, which is arranged on a depositing area 100 above the recess 110.

Figure 2:
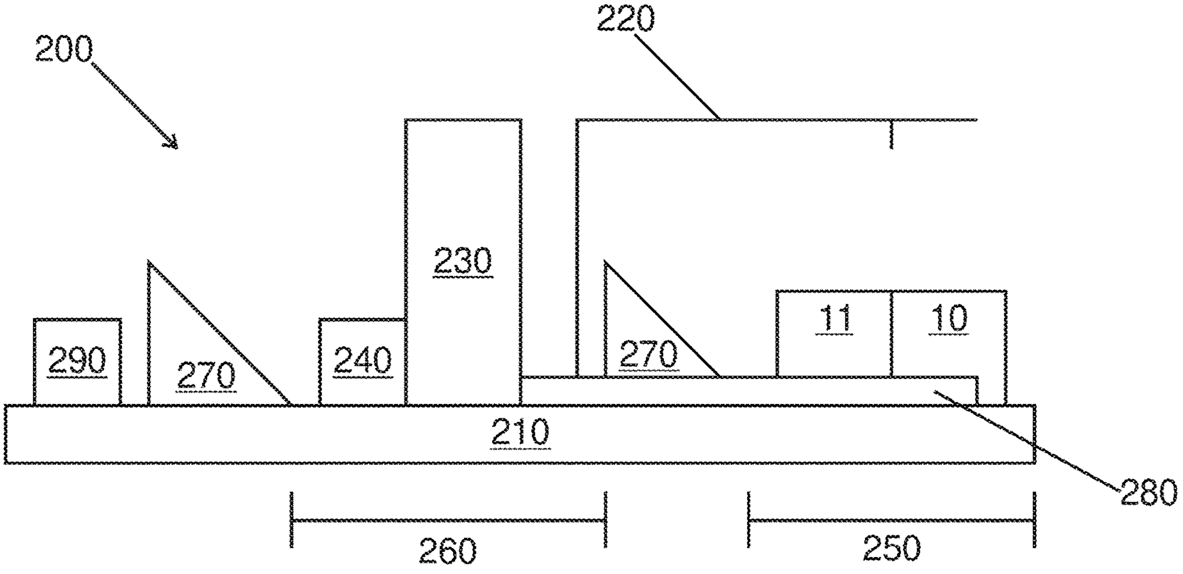
FIG. 2 is a floatable delaboration platform.

FIG. 2 shows a floatable delaboration platform 200. This has a floatable platform 210, for example a pontoon. In the example shown, two delaboration chambers 10, 11 are arranged in a first platform region 250. For practical reasons, they would tend to be arranged perpendicularly to the plane of the image. However, here they are shown as they are for better representation. For example and advantageously, there may also be more delaboration chambers 10, 11, for example four delaboration chambers 10, 11. The first platform region 250 is separated from the second platform region 260 by a protective element 270. The protective element is designed in such a way that a surface is arranged at a 45° angle in relation to the surface of the second platform region 260 and at a 135° angle in relation to the surface of the first platform region 250. If there is a detonation in one delaboration chamber 10, 11 and the pressure wave of the detonation is not only directed upwardly by the inner floor 40, the first chamber region 50 and the pressure relief 60, a pressure wave proceeding horizontally towards the second platform region 260 is diverted upwards by the protective element and thus protects the devices arranged in the second platform region 260.

An incineration device 230 is arranged in the second platform region 260. It is preferably designed for safely incinerating pieces of munition for example of a size of 10 kg each. The incineration device 230 is adjoined in the example shown by a gas cleaning means 240, in order to clean the incineration exhaust gases, in particular in order to filter out or convert chemical warfare agents and their combustion products. In this way, ordnance 90 with chemical warfare agents can also be destroyed reliably and safely. In order to transport the pieces of munition from the delaboration chambers 10, 11 to the incineration device 230, the floatable delaboration platform 200 has a transporting device 280, for example a conveyor belt. Furthermore, a lifting device 220, with which ordnance 90 can be lifted out of the water and introduced directly into the delaboration chambers 10, 11, is preferably arranged in the second platform region 260. By the positioning of the lifting device 220 in the second platform region 260, the base of the lifting device 220 is likewise protected by the protective element 270, and so in the event of a detonation, especially when inserting the ordnance 90 into a delaboration chamber 10, 11, where the risk is greatest, only a small, easily repairable part of the lifting device 220 has to be repaired or replaced.

Furthermore, the floatable delaboration platform 200 may have a third platform region, which is arranged behind the second platform region 260 and is separated from it by a further protective element 270. As a result, this region is the best-protected region, and so, for example, quarters 290 for the crew can be arranged here. Other system-relevant components (drive, communication, radar, possibly sonar for tracing the ordnance under water) may also be preferably arranged in this region.

DESIGNATIONS

10, 11 delaboration chamber
20 outer housing
30 cover
40 inner floor
50 first chamber region
60 pressure relief
70 cutting device
80 chamber lifting device
90 ordnance
100 depositing area
110 recess
120 transporting container
130 cardboard box
200 floatable delaboration platform
210 floatable platform
220 lifting device
230 incineration device
240 gas cleaning means
250 first platform region
260 second platform region
270 protective element
280 transporting device
290 quarters

What is claimed is:

1. A delaboration chamber comprising:

an outer housing sealed by a removable cover; and an inner floor, wherein a chamber region is formed underneath the inner floor by the inner floor and the outer housing, wherein the chamber region is filled with a flowable or solid medium, wherein the inner floor has a recess for receiving an explosive object, wherein the removable cover is connected to the outer housing in a shockproof manner, wherein the removable cover has a pressure relief, wherein the pressure relief has at least one deflection for [the] detonation gases;

wherein the outer housing is configured to house a separating device for use in delaboration of the explosive object.

2. The delaboration chamber according to claim 1, wherein the delaboration chamber includes the separating device and the separating device includes a cutting device.

3. The delaboration chamber according to claim 2, wherein the cutting device is a water-jet device.

4. The delaboration chamber according to claim 2, wherein the cutting device is a bandsaw.

5. The delaboration chamber according to claim 4 wherein the delaboration chamber has at least one-first chamber lifting device.

6. The delaboration chamber according to claim 5 wherein the inner floor has a planar depositing area, wherein the depositing area is arranged above the recess for receiving an explosive object.

7. The delaboration chamber according to claim 6 wherein the pressure relief is connected to a gas cleaning means.

8. A floatable delaboration platform comprising:

at least one first lifting device, wherein the floatable delaboration platform has at least one first delaboration chamber according to claim 1, wherein the floatable delaboration platform has at least one destruction installation comprising a first incineration device.

9. The floatable delaboration platform according to claim 8 wherein the floatable delaboration platform has at least one first platform region and one second platform region, wherein the at least one first delaboration chamber is arranged in the first platform region, wherein the at least one first incineration device is arranged in the second platform region, wherein at least one first protective element is arranged between the first platform region and the second platform region, wherein the at least one first protective element has a surface, wherein the surface of the protective element has an angle of 120° to 150° in relation to the surface of the first platform region, wherein the surface of the protective element has an angle of 30° to 60° in relation to the surface of the second platform region.

10. The floatable delaboration platform according to claim 9 wherein the floatable delaboration platform has a transporting device for transporting pieces of munition from the at least one first delaboration chamber to the at least one first incineration device.

11. A method for destroying underwater ordnance with a floatable delaboration platform according to claim 10, wherein the method comprises the following steps:

a) lifting an ordnance out of the water by means of the at least one first lifting device,
b) pivoting the ordnance over the at least one first delaboration chamber,
c) lowering the ordnance into the at least one first delaboration chamber, into the recess in the inner floor,
d) sealing the at least one first delaboration chamber,
e) breaking up the ordnance within the delaboration chamber, wherein a piece of munition is detached,
f) repeating step e) until the ordnance is dismantled,
g) opening the at least one first delaboration chamber,
h) lifting out the pieces of munition from the at least one first delaboration chamber,
i) transporting the pieces of munition to the at least one first incineration device, and
j) incinerating the pieces of munition in the at least one first incineration device.

12. The method according to claim 11 wherein in step e), after breaking up the ordnance, the piece of munition is brought onto a planar area of the inner floor.

13. The method according to claim 12 wherein between step c) and step d) a transillumination device is placed onto the opened delaboration chamber, the ordnance is transilluminated and the transillumination device is removed again.

14. The method according to claim 13 wherein the ordnance is lifted out of the water in a transporting container in step a) and is introduced into the delaboration chamber in the transporting container in step c) and is broken up in the transporting container or with the transporting container in step e).

15. The method according to claim 14 wherein the pieces of munition are deposited into flammable boxes comprising cardboard boxes, in step e), are transported in the flammable boxes, in particular in the cardboard boxes, in steps h) and i) and are incinerated with the flammable boxes, in particular with the cardboard boxes, in step j).

* * * * *